US008558868B2

(12) United States Patent
Prentice

(10) Patent No.: US 8,558,868 B2
(45) Date of Patent: Oct. 15, 2013

(54) CONFERENCE PARTICIPANT VISUALIZATION

(75) Inventor: Steven Charles Prentice, Ephrata, WA (US)

(73) Assignee: Cisco Technology, Inc., San Jose, CA (US)

( * ) Notice: Subject to any disclaimer, the term of this patent is extended or adjusted under 35 U.S.C. 154(b) by 640 days.

(21) Appl. No.: 12/828,982

(22) Filed: Jul. 1, 2010

(65) Prior Publication Data

US 2012/0002001 A1   Jan. 5, 2012

(51) Int. Cl.
*H04N 7/14* (2006.01)
*G06F 3/01* (2006.01)
*H04L 12/66* (2006.01)

(52) U.S. Cl.
USPC ............. 348/14.08; 235/377; 348/14.03; 348/14.09; 370/352; 379/202.01; 455/446; 707/746; 707/812; 709/205; 709/219; 714/47.1; 715/239; 715/743; 715/753; 715/781; 718/104

(58) Field of Classification Search
USPC ........... 348/14.03, 14.08, 14.09; 370/352; 707/746, 812; 709/205, 219; 715/239, 715/743, 753, 781; 725/94; 235/377; 379/202.01; 455/446; 714/47.1; 718/104
See application file for complete search history.

(56) References Cited

U.S. PATENT DOCUMENTS

| | | | |
|---|---|---|---|
| 5,363,507 A * | 11/1994 | Nakayama et al. ........... | 715/743 |
| 7,593,032 B2 | 9/2009 | Civanlar et al. | |
| 7,809,792 B2 * | 10/2010 | Hirata et al. ................. | 709/205 |
| 8,112,425 B2 * | 2/2012 | Baum et al. ................... | 707/746 |
| 8,160,595 B2 * | 4/2012 | Sawahashi et al. ........... | 455/446 |
| 8,165,109 B2 * | 4/2012 | King et al. .................... | 370/352 |
| 8,205,122 B1 * | 6/2012 | Leverich et al. ............. | 714/47.1 |
| 8,205,167 B2 * | 6/2012 | Kang et al. ................... | 715/781 |
| 8,228,363 B2 * | 7/2012 | Halavy ....................... | 348/14.09 |
| 8,279,259 B2 * | 10/2012 | Ali et al. .................... | 348/14.08 |
| 8,300,789 B2 * | 10/2012 | Shah et al. ................ | 379/202.01 |
| 8,316,104 B2 * | 11/2012 | Galvez et al. ................ | 709/219 |
| 8,336,762 B1 * | 12/2012 | DiMattina et al. ............ | 235/377 |
| 8,347,306 B2 * | 1/2013 | Li et al. ........................ | 718/104 |
| 8,446,452 B2 * | 5/2013 | Hosseini et al. ........... | 348/14.08 |
| 2005/0278760 A1 * | 12/2005 | Dewar et al. .................... | 725/94 |

(Continued)

OTHER PUBLICATIONS

Kim et al., *Meeting Mediator: Enhancing Group Collaboration using Sociometric Feedback*, MIT Media Lab, accessed Apr. 27, 2010.

(Continued)

*Primary Examiner* — Gerald Gauthier
(74) *Attorney, Agent, or Firm* — Brinks Hofer Gilson & Lione

(57) ABSTRACT

In one implementation, a conference bridge or a multipoint conference unit (MCU) receives media streams from the endpoints in the conference. The media stream may contain at least one of audio, video, file sharing, or collaboration data. The MCU measures a characteristic in each of a plurality of media streams and calculates statistics based on the individual participation levels of the endpoints. A dynamic participation indicator displayed at the endpoints shows the relative participation levels of the endpoints. For example, the dynamic participation indicator may show the names of the users in a font that changes size and/or location as the participation level changes. In another example, the dynamic participation indicator may show respective videos of the endpoints in a format and/or size that changes as the participation level changes.

20 Claims, 11 Drawing Sheets

(56) References Cited

U.S. PATENT DOCUMENTS

| | | | |
|---|---|---|---|
| 2010/0162101 A1* | 6/2010 | Anisimov et al. | 715/239 |
| 2011/0029893 A1* | 2/2011 | Roberts et al. | 715/753 |
| 2011/0066664 A1* | 3/2011 | Goldman et al. | 707/812 |
| 2011/0085016 A1* | 4/2011 | Kristiansen et al. | 348/14.03 |
| 2012/0002001 A1* | 1/2012 | Prentice | 348/14.08 |

OTHER PUBLICATIONS

Mathur et al., *Visualizing Remote Voice Conversations*, CHI 2009, Boston, Mass., Apr. 2009.

* cited by examiner

CONFERENCE PARTICIPANT VISUALIZATION

FIELD

The present embodiments relate to audio and/or video conferencing.

BACKGROUND

A conference bridge receives media streams from endpoints and converges the media streams into a single feed. The conference bridge sends the single feed to the multiple endpoints. A conference bridge may also be referred to as a multipoint control unit or a multipoint conferencing unit (MCU).

The endpoints may also display a list of the participants of the conference. The list may indicate which endpoint is active and which endpoint created the conference. However, this information is transient and hard to follow by participants.

DETAILED DESCRIPTION

Overview

Figure 1:
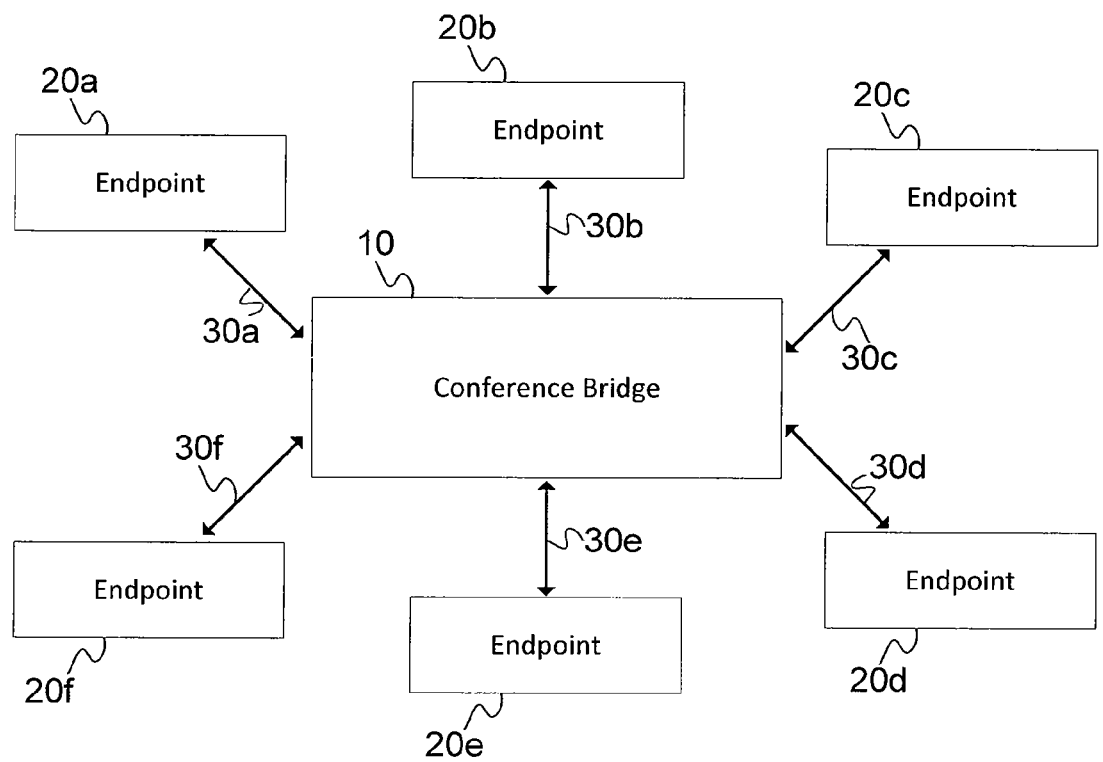
FIG. 1 illustrates one embodiment of a conference bridge in communication with multiple endpoints.

A multipoint conference unit (MCU) receives media streams from at least two endpoints. The media stream may contain at least one of audio, video, file sharing, or collaboration data. The MCU measures the activity of the endpoints and calculates statistics based on the activity. The statistics may provide an indication of the relative participation levels of the endpoints. The statistics may be used to generate one or more dynamic participation indicators that graphically or otherwise compare the participation levels of the endpoints. For example, the dynamic participation indicator may show the names of the users in a font that changes size and/or location as the participation level changes. In another example, the dynamic participation indicator may show respective videos of the endpoints in a format and/or size that changes as the participation level changes.

In one aspect, a method includes measuring a characteristic of an input media stream from at least one conference participant of a plurality of conference participants, calculating a statistic from the characteristic of the input media stream over a time period, and outputting an integrated representation of the at least one of conference participant and the statistic in combination with an output media stream for the plurality of conference participants.

In a second aspect, an apparatus includes an input interface configured to receive a media stream from a source, a controller configured to calculate at least one statistic from the media stream over a time period, wherein the statistic indicates a participation level of the source, and an output interface configured to transmit a combined representation of the statistic and the source for display on the source.

In a third aspect, logic encoded in one or more non-transitory tangible media is executable by a processor and operable to measure a characteristic in each of a plurality of media streams from a plurality of endpoints, calculate a statistic of the characteristic in each of the plurality of media streams over a time period, represent the statistic for each of the plurality of media streams in combination with an alphanumeric representation of the source as a dynamic conference participation symbol, and output the dynamic conference participation symbol to at least one of the plurality of endpoints.

Example Embodiments

In audio or video conferencing, the participation of each endpoint over time is recorded. A conference bridge calculates statistics regarding the recorded participation. The statistics can be used to represent which endpoints have been active in the audio or video conference and to what extent the endpoints have been active.

A simple list of participants, even when the list indicates which endpoint is active, provides information regarding only the exact moment in time. The list cannot show which endpoints have spent the most time speaking. Further, the list cannot differentiate endpoints that have not participated from endpoints which have participated but are no longer active. The list does not show historical participation information, such as the level of participation in a plurality of increments over a period.

FIG. 1 illustrates one embodiment of a conference incorporating a dynamic participation indication. The conference includes a conference bridge 10 in communication with multiple endpoints 20a-f via communication paths 30a-f. Each of the endpoints 20a-f records a source of audio and/or video and transmits a resulting media stream to the conference bridge 10. The conference bridge 10 receives the media streams from each of the endpoints 20a-f and outputs a combined and/or selected media stream to the endpoints 20a-f.

Figure 2:
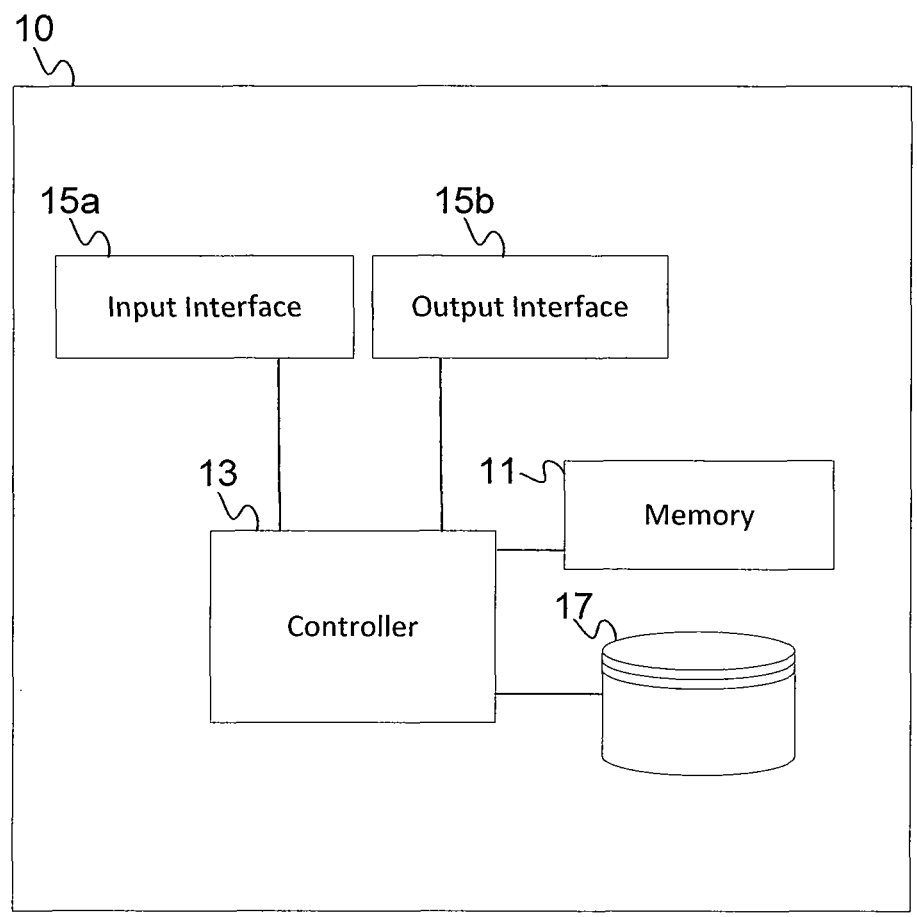
FIG. 2 illustrates one embodiment of the conference bridge of FIG. 1.

FIG. 2 illustrates one embodiment of the conference bridge 10 of FIG. 1. The conference bridge 10 includes a controller 13, a memory 11, a database 17, and a communications interface, including an input interface 15a and an output interface 15b. The input interface 15a receives a media stream from at least two of the endpoints 20a-f. The controller 13 calculates at least one statistic indicative of a participation level from the media stream over a time period. The output interface 15b transmits at least one statistic with or without being combined with source for display on one or more of the endpoints 20a-f. Additional, different, or fewer components may be provided.

The statistic indicative of a participation level may be calculated by the controller 13 for each of the endpoints 20a-f. The statistic may be the amount of time a particular endpoint has been active (e.g., speaking or otherwise presenting) over a time period. The time period may be any predetermined amount of time (e.g., one minute or ten minutes), a percentage of the total conference (e.g., the most recent 20%), or the total conference. In the alternative or in addition, the statistic may be a measure of the relative active time of a particular endpoint. That is, the statistic may indicate how much the particular endpoint has been active as compared with the other endpoints. In an alternative implementation, the statistic may be calculated by each of the endpoints 20a-f and transmitted to the conference bridge 10, which forwards the information to all of the endpoints 20a-f.

As another example, the statistic may reflect the aggressiveness of a particular endpoint. For example, the statistic may indicate how much time the particular endpoint is active at the same time as another endpoint. In other words, the statistic may measure how often the speaker of an endpoint is talking over another speaker. Alternatively, the aggressiveness of a particular endpoint may be measured by the average length of a "turn" (i.e., relatively continuous speaking). Further, the aggressiveness of a particular endpoint may be measured by the frequency that the speaker yields to another speaker.

As another example, the statistic may indicate the participation of a particular endpoint by communication methods other than talking. The other communication method may include sharing a document, providing input to a white board, sharing a video, sharing a presentation, using an instant messenger within the conference, or using an instant messenger outside of the conference.

In some situations, the statistic may indicate activity by a particular endpoint that negatively affects the participation of the endpoint. Negative factors may be whether the endpoint has muted itself, whether the endpoint has gone into an idle state due to inactivity, or whether the endpoint is engaged in instant messaging or other communication outside of the conference. Further, the capabilities of the endpoint, such as the bandwidth, whether the endpoint is participating in audio only, or whether the endpoint is a mobile device may be included in or be the calculation of the statistic that negatively effects the participation of the endpoint.

A given statistic may be a single value. Alternatively, the statistic is a combination of a plurality of other statistics. For example, a function combines various statistics into one value. In other embodiments, a plurality of different statistics may be output for display together, such as a statistic for positive participation factors and another statistic for negative participation factors. For a simple example, a conference may include six participants where participant A has been speaking 60% of the time, participant B has been speaking 30% of the time, and participant C has been speaking 10% of the time. The remaining three participants have been speaking less than 0.5% of the time, which may include, for example, an introduction or hello. In this case, the participation time statistic may be shown with a simple "60%" placed near participant A's name as well as the respective statistics for the other participants. Alternatively, participant A's name could be shown in a font about twice as large as participant B's name and about six times as large as participant C's name.

The conference bridge 10 may be a video conferencing bridge or an audio conferencing bridge, either of which may be referred to as a multipoint conferencing unit (MCUs). The conference bridge 10 may operate through either transcoding or switching. A transcoding conference bridge decodes the media stream from one or more endpoints and re-encodes a data stream for one or more endpoints. A switching conference bridge transmits the video and/or audio of selected endpoint(s) to the other endpoints based on the active speaker. In the case of more than one active speaker, plural endpoints would be selected by the switching video conference bridge. Alternatively, the quantitative measure of voice activity may be performed by the endpoints prior to transmission of the corresponding media stream.

H.264-SVC and H.264-AVC are video compression standards. H.264-AVC is formally known as ISO/IEC 14496-10 MPEG-4 Part 10, Advanced Video Coding, completed May 2003 available at http://www.itu.int. Scalable Video Coding (SVC or H.264-SVC) is an extension found at Appendix G of H.264-AVC, completed November 2008, also available at http://www.itu.int. The SVC extension enables the encoding of video streams that contain one or more subset video streams, which may be referred to as layers. The conference may include a mix of H.264-SVC and H.264-AVC endpoints.

The memory 11 may be any known type of volatile memory or a non-volatile memory. The memory 11 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 11 may include an optical, magnetic (hard drive) or any other form of data storage device. The memory 11 may be located in a remote device or removable, such as a secure digital (SD) memory card.

The database 17 may be external to the conference bridge 10 or incorporated within the conference bridge 10. The database 17 may be stored with memory 11 or separately. The database 17 may be implemented as either hardware or software.

The memory 11 may store computer executable instructions. The controller 13 may execute computer executable instructions. The computer executable instructions may be included in computer code. The computer code may be stored in the memory 11. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code may be logic encoded in one or more tangible media or one or more non-transitory tangible media for execution by the controller 13. Logic encoded in one or more tangible media for execution may be defined as instructions that are executable by the controller 13 and that are provided on the computer-readable storage media, memories, or a combination thereof. Instructions for instructing a network device may be stored on any logic. As used herein, "logic" includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The instructions may be stored on any computer readable medium. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 13 may include a general processor, digital signal processor, application specific integrated circuit, field programmable gate array, analog circuit, digital circuit, server processor, combinations thereof, or other now known or later developed processor. The controller 13 may be a single device or combinations of devices, such as associated with a network or distributed processing. Any of various processing strategies may be used, such as multi-processing, multi-tasking, parallel processing, remote processing, centralized processing or the like. The controller 13 may be responsive to or operable to execute instructions stored as part of software, hardware, integrated circuits, firmware, microcode or the like. The functions, acts, methods or tasks illustrated in the figures or described herein may be performed by the controller 13 executing instructions stored in the memory 11. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface(s) 15*a-b* may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. For example, the I/O interface(s) 15*a-b* may include a first communication interface devoted to sending data, packets, or datagrams and a second communication interface devoted to receiving data, packets, or datagrams. Alternatively, the I/O interface(s) 15*a-b* may be implemented using a single communication interface.

The communication paths 30*a-f* may be any protocol or physical connection that is used to couple a server to a computer. The communication paths 30*a-f* may utilize Ethernet, wireless, transmission control protocol (TCP), internet protocol (IP), or multiprotocol label switching (MPLS) technologies. As used herein, the phrases "in communication" and "coupled" are defined to mean directly connected to or indirectly connected through one or more intermediate components. Such intermediate components may include both hardware and software based components.

The endpoints 20*a-f* may include a processor, a memory, and a communication interface according to the examples discussed above. In addition, the endpoints 20*a-f* include a display and at least one input device. The display may be a cathode ray tube (CRT) monitor, a liquid crystal display (LCD) panel, or another type of display. The input device may include a camera, a microphone, a keyboard, and/or a mouse. The endpoints 20*a-d* are capable of producing a media stream, including video and/or audio, that originates with the camera and/or microphone and is compressed and encoded by the processor or codecs. The endpoints 20*a-f* may also include one or more speakers.

Figure 3:
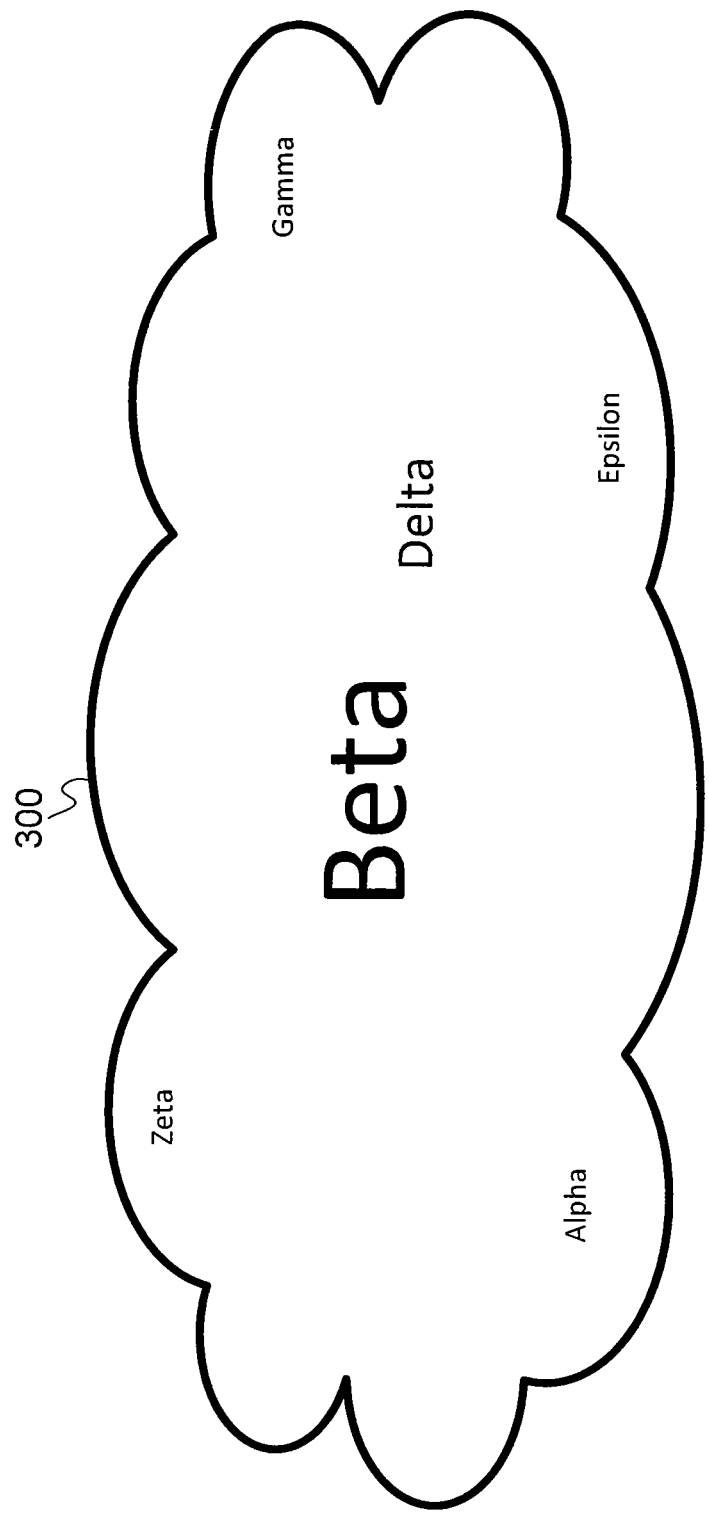
FIG. 3 illustrates one embodiment of a dynamic participation indicator using alphanumeric symbols.

FIG. 3 illustrates one embodiment of a dynamic participation indicator 300. As discussed above, one or more statistics are calculated by the controller 13 of the conference bridge 10. The conference bridge 10 outputs the dynamic participation indicator 300 as an integrated representation of the statistic and the endpoint. For example, as an endpoint participates more, an alphanumeric symbol indicative of the endpoint or the source is shown with a larger font and/or closer to the center of the dynamic participation indicator 300. The dynamic participation indicator 300 may resemble a tag cloud used in Web 2.0 applications but need not be in the actual shape of a cloud. The dynamic participation indicator 300 differs from conventional tag clouds in that the frequency of words is not used in determining the content of the dynamic participation indicator 300 or the size and position of the alphanumeric symbols.

In the example shown in FIG. 3, a conference includes six endpoints or sources: Alpha, Beta, Gamma, Delta, Epsilon, and Zeta. At the particular moment in time shown in FIG. 3, Beta has participated in the conference, during the time period used to calculate the statistic, more than the other endpoints, and Delta has participated more than the other endpoints besides Beta. Alpha, Epsilon, Gamma, and Zeta are shown in small font and also at the perimeter of the dynamic participation indicator, which illustrates that they have not participated a threshold amount during the time period used to calculate the statistic.

Figure 4:
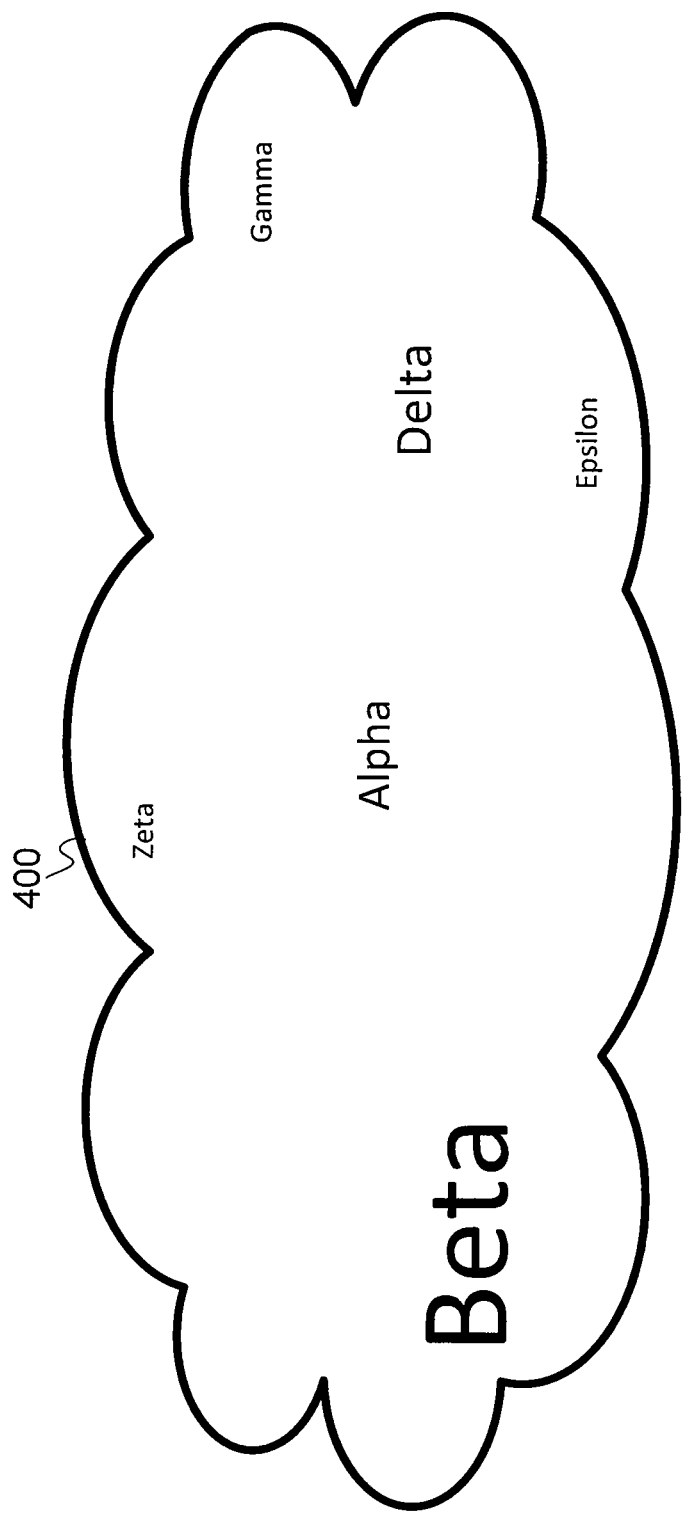
FIG. 4 illustrates another embodiment of a dynamic participation indicator using alphanumeric symbols.

FIG. 4 illustrates another embodiment of a dynamic participation indicator 400. In the example shown in FIG. 4, a conference includes six endpoints or sources: Alpha, Beta, Gamma, Delta, Epsilon, and Zeta. The example shown in FIG. 4 differs from the example shown in FIG. 3 in that the two dimensions of dynamic participation indicator 400 are independent. That is, the size of font for the name of each endpoint and the location of the name of each endpoint are independent and may represent different statistics.

In one example, the location of the name of the endpoint indicates how much time has passed since the endpoint was the active speaker, and the size of the font indicates how much of the total time period the endpoint has been the active speaker. The particular point in time shown in FIG. 4 would indicate that Alpha is the current speaker, Delta is the previous speaker, and Beta has been the most active speaker over the time period.

In addition or in the alternative, the current speaker may be indicated by a heavier font, a different color, or a vibrating name. While not illustrated, the alphanumeric symbol for the endpoint that is currently participating may vibrate to the beat or rhythm of the speech. For example, each syllable may cause a vibration. In addition, different types of participation, such as sharing a document, providing input to a white board, sharing a video, sharing a presentation, or using an instant messenger, may be shown independently using different visual cues. The visual cues may be real time indicators. The visual cues may be color of the text, vibration of the text, rotation of the text, or any graphical modification of the text.

Figure 5:
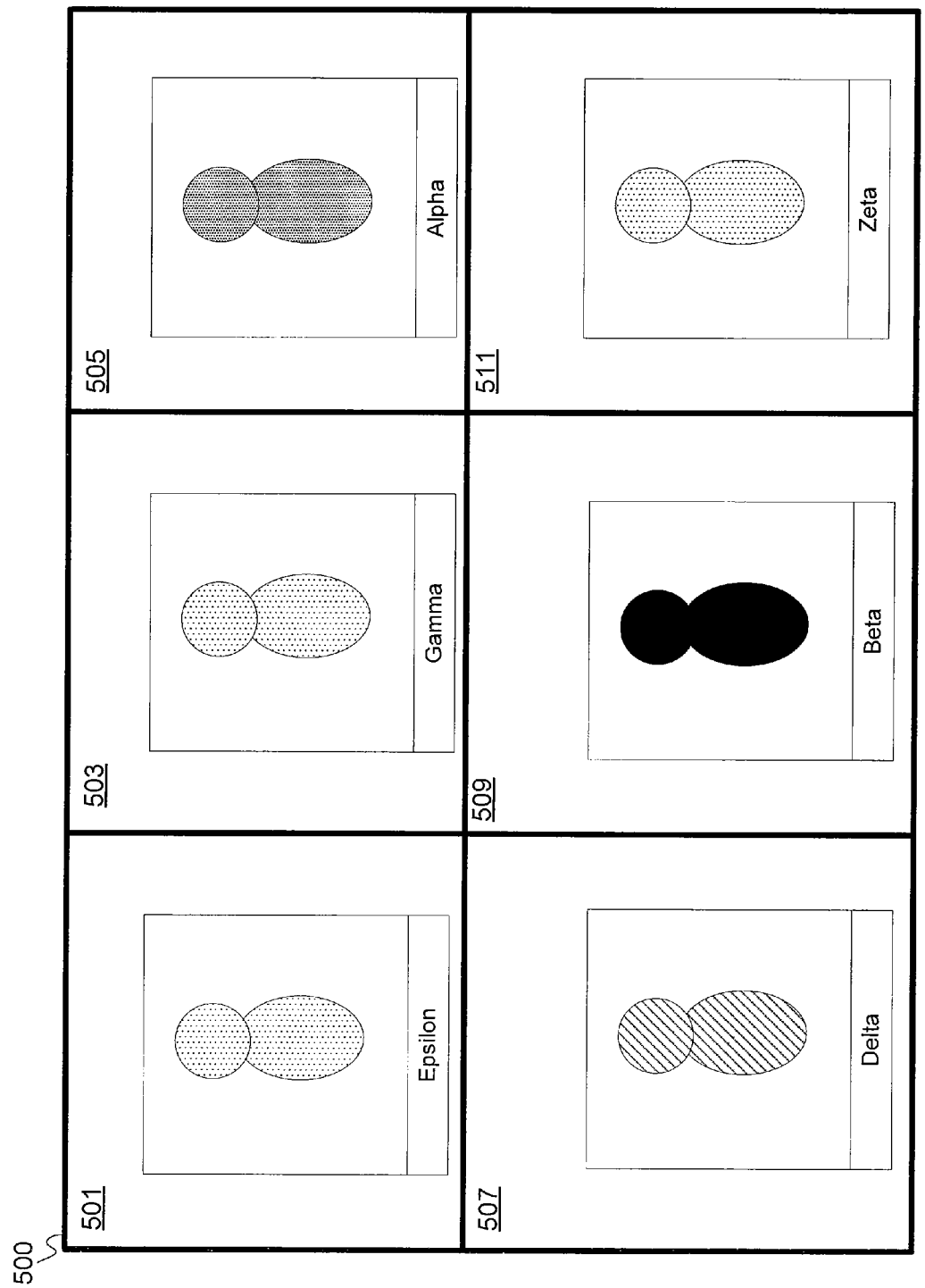
FIG. 5 illustrates an embodiment of a dynamic participation indicator in a video conference.

FIG. 5 illustrates an embodiment of a dynamic participation indicator 500 in a video conference. The dynamic participation indicator 500 conveys the participation level of the endpoints through the video format of the respective endpoints. The video format may vary in refresh rate, sampling ratios, resolution, or another specification of the video.

Available formats for the videos include common intermediate format (CIF), which may have a resolution of 352×288 pixels, quarter common intermediate format (QCIF), which may have a resolution of 176×144 pixels, 4× common intermediate format (4CIF), which may have a resolution of 704×576 pixels, and 16× common intermediate format (16CIF), which may have a resolution of 1408×1152. Other possible formats include standard definition (SD), which may have a resolution of 480*p*, 480*i*, 576*p*, or 576*i*, and high definition (HD), which may have a resolution of 720*p*, 1080*p*, and 1080*i*. Other resolutions may be possible. One possible algorithm for the scalability of video resolution is referred to as spatial scalability in H.264-SVC.

Sampling ratios are related to quality or fidelity. The Y'CbCr color space represents luma (Y), blue difference chroma (Cb), and red difference chroma (Cr). A sampling ratio may be expressed as a three part ratio Y':Cb:Cr, describing the number of luminance and chrominance samples. Some video compression standards take advantage of the human eye's sensitivity to color over luminance. For example, 4:2:2 sampling uses only two-thirds of the bandwidth of 4:4:4 sampling but results in negligible perceived loss of quality by the human eye. However, defects may become apparent as the video is displayed at a larger size. Example sampling ratios include 4:4:4, 4:2:2, 4:2:1, 4:1:1, 4:2:0, 4:1:0, and 3:1:1. One possible algorithm for the scalability of quality or fidelity, referred to as quality scalability, is specified in H.264-SVC.

Possible values for the refresh rate, which may also be referred to as frame rate, include 60 frames per second, 20 frames per second, and 10 frames per second. Other possible frame rates may be provided. One possible algorithm for the scalability of frame rates, referred to as temporal scalability, is included in H.264-SVC.

The conference bridge 10 receives media streams from endpoints 20a-f at the input interface 15a. The controller 13 calculates at least one statistic of the media streams over a time period. The statistic is indicative of a participation level of the source. For example, the statistic may be related to how long or to what extent the endpoint is active. The output interface 15b transmits a combined representation of the statistic and the source for display on the endpoints 20a-f. The combined representation of the statistic and the source may be a labeled video varied in size, refresh rate, sampling ratios, resolution, or any of the specifications of the video discussed previously.

For example, as shown in FIG. 5, Beta video 509 has a high resolution, which indicates endpoint 20b has been the most active endpoint in the conference during the relevant time period. Endpoint 20a, which corresponds to Alpha video 505, has been the next most active participant, and endpoint 20d, which corresponds to Delta video 507, has been the third most active participant. Endpoints 20e, 20c, and 20f, which correspond to Epsilon video 501, Gamma video 503, and Zeta video 511, respectively, have participated very little or none in the conference, as shown by the low resolution video.

Figure 6:
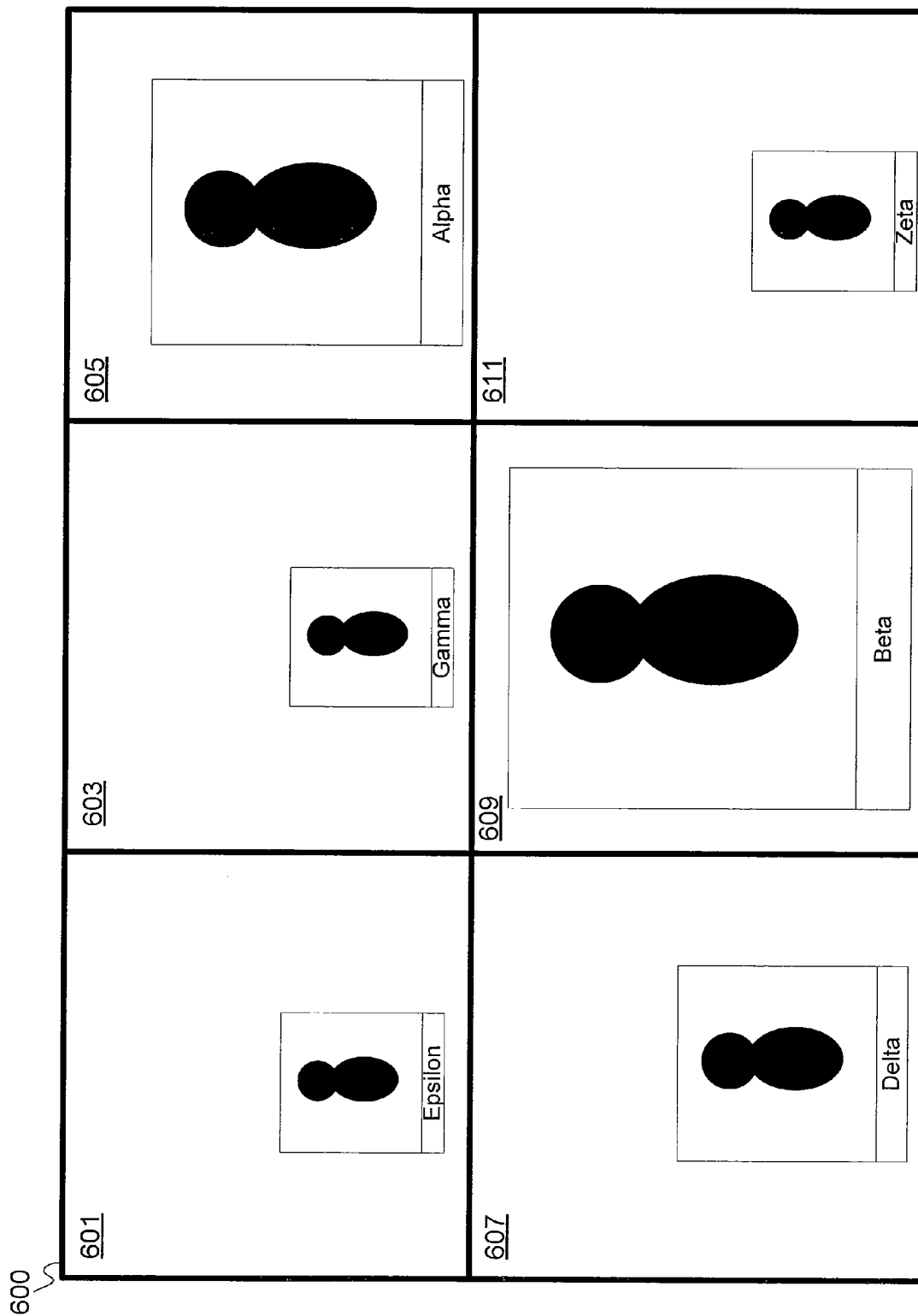
FIG. 6 illustrates another embodiment of a dynamic participation indicator in a video conference.

FIG. 6 illustrates another embodiment of a dynamic participation indicator 600 in a video conference. In FIG. 6, the representation of the statistic and the source is shown by varying the size of the labeled video. Beta video 609 has the largest size, which indicates endpoint 20b has been the most active endpoint in the conference during the relevant time period. Endpoint 20a, which corresponds to Alpha video 605, has the second largest size and accordingly has been the second most active participant. Endpoint 20d, which corresponds to Delta video 607, has been the third most active participant, as shown by the third largest size. Endpoints 20e, 20c, and 20f, which correspond to Epsilon video 601, Gamma video 603, and Zeta video 611, respectively, have participated very little or not at all in the conference, as shown by the smallest size of video.

Figure 7:
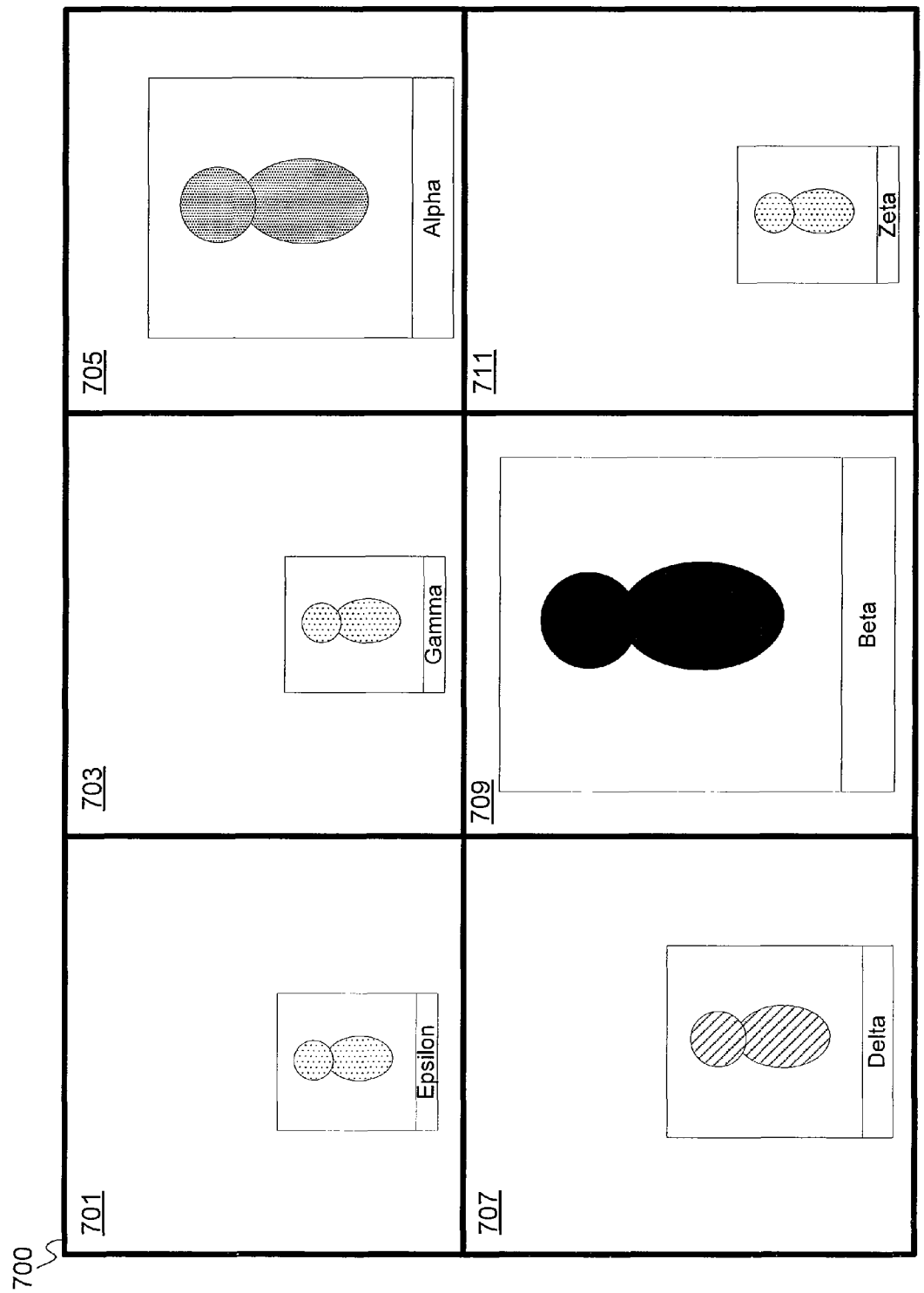
FIG. 7 illustrates another embodiment of a dynamic participation indicator in a video conference.

FIG. 7 illustrates another embodiment of a dynamic participation indicator 700 in a video conference. FIG. 7 illustrates the representation of the statistic and the source by varying both the size of the labeled video and the varied video resolution. Again, in the particular example of a conference at the time shown, the various endpoints are ranked in order of participation as Beta video 709, Alpha video 705, Delta video 707, Epsilon video 701, Gamma video 703, and Zeta video 711. Other indications may be used, such as providing the size, refresh rate, sampling ratios, resolution, or any of the specifications of the video independently of the indication. The indication is overlaid with the video, such as a color or other alteration of the video image.

Figure 8:
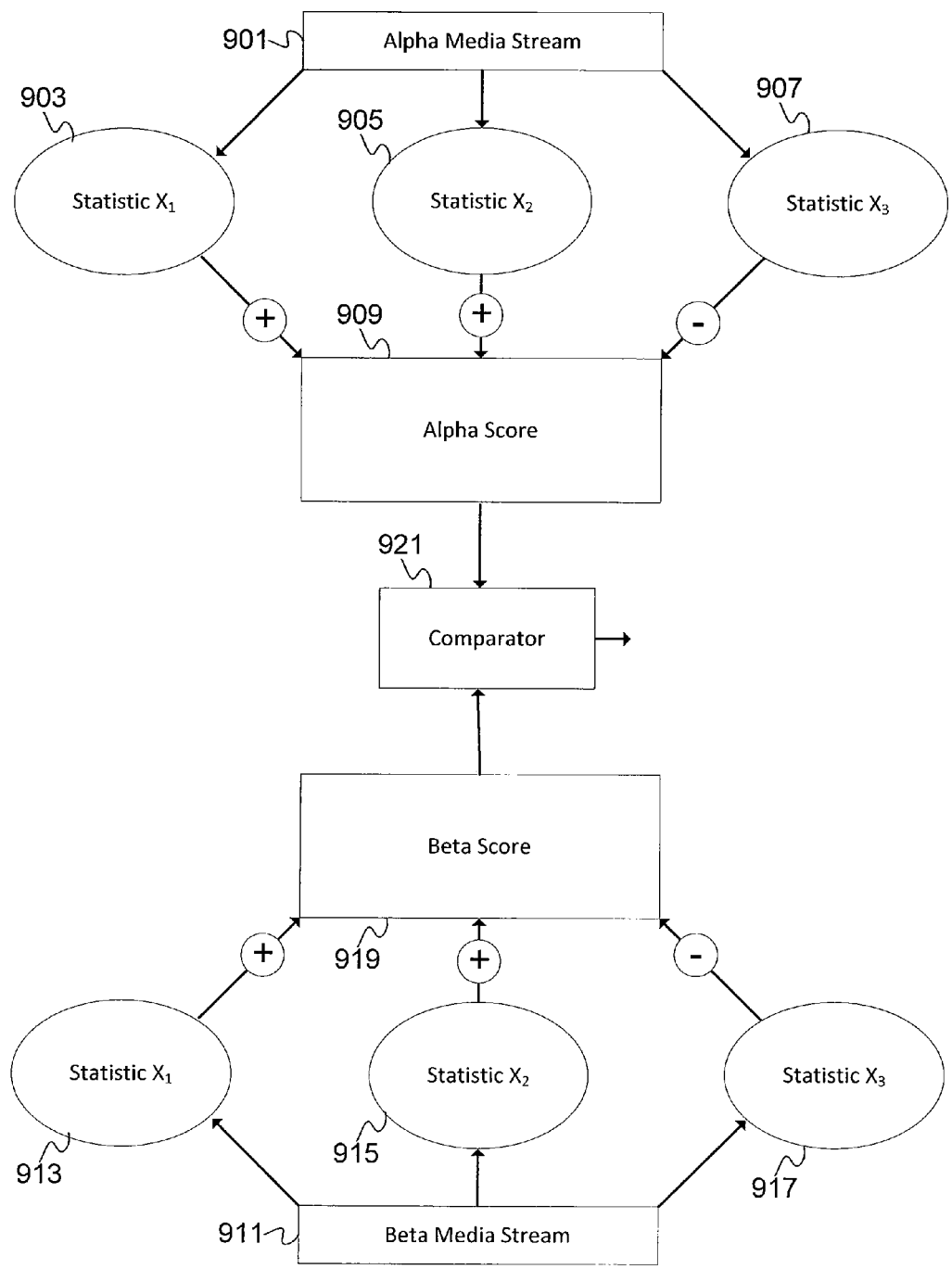
FIG. 8 illustrates an embodiment of a calculation used to calculate the dynamic participation indicators of any of FIGS. 3-7.

FIG. 8 illustrates an embodiment of a calculation used to calculate the dynamic participation indicators of any of FIGS. 3-7. The controller 13 or endpoints 20a-f may calculate a score for each of endpoints 20a-f. The score may be a sum of weighted averages of two or more of the various statistics. For example, in the formula below, a score S is the sum of weight $W_1$ applied to the statistic $X_1$ related to the amount of time the endpoint has been active, weight $W_2$ applied to the statistic $X_2$ related to the aggressiveness of the endpoint, weight $W_3$ applied to the statistic $X_3$ related to communication methods other than speaking, and W4 applied to the statistic X4 related to factors that negatively affect participation in the conference. Any combination of the statistics above may be used in calculating the score, such as subtracting negative factors. The weights may be any value from 0 to 1 in one embodiment, or other values in other embodiments. In this example, the score S may be calculated as:

$$S=*+W_2*X_2+W_3*X_3+W4*X4$$

The controller 13 calculates a score for each endpoint 20a-f. FIG. 8 illustrates an alpha media stream 901 and a beta media stream 911 received at the conference bridge 10. The controller 13 measures predetermined statistics 903, 905, and 907, which are weighted according to predetermined values that may be positive or negative, from the alpha media stream 901 to arrive at an alpha score 909. Likewise, the controller 13 measures predetermined statistics 913, 915, and 917, which are weighted according to predetermined values that may be positive or negative, from the beta media stream 911 to arrive at a beta score 919. The controller 13 may compare the alpha score 909 to the beta score 919, as illustrated by comparator 921, to determine the relative size or location of the alphanumeric symbol that represents endpoints 20a and 20b. Alternatively, the result of the comparison may determine the video size, resolution, quality, format, or frame rate.

Rather than an equation, the score may also be implemented as a quantity for each endpoint that changes based on the activities of the endpoint. For example, the score may start at 100. For every ten seconds that the endpoint is speaker, the score is increased by 1. For every ten seconds that the endpoint is sharing content, the score is increased by 2. For every minute that the endpoint has gone without any participation, the score is decreased by 1. The indicator may be an alphanumeric representation of the quantity, such as displaying "103."

The score may be displayed using the dynamic participation indicators of FIGS. 3-7. For each endpoint, the font size, video size, alphanumeric symbol location, and/or video parameter may be varied in a manner proportional to the score. For example, an endpoint with a score of 60 would be shown with a font half the size of an endpoint with a score of 120. As an example, a series of ranges may be used. For example, a small font size may be used for score below 80, a medium font size used for scores from 80-120, and a large font size used for scores higher than 120. In addition, various other relationships may be used.

Figure 9:
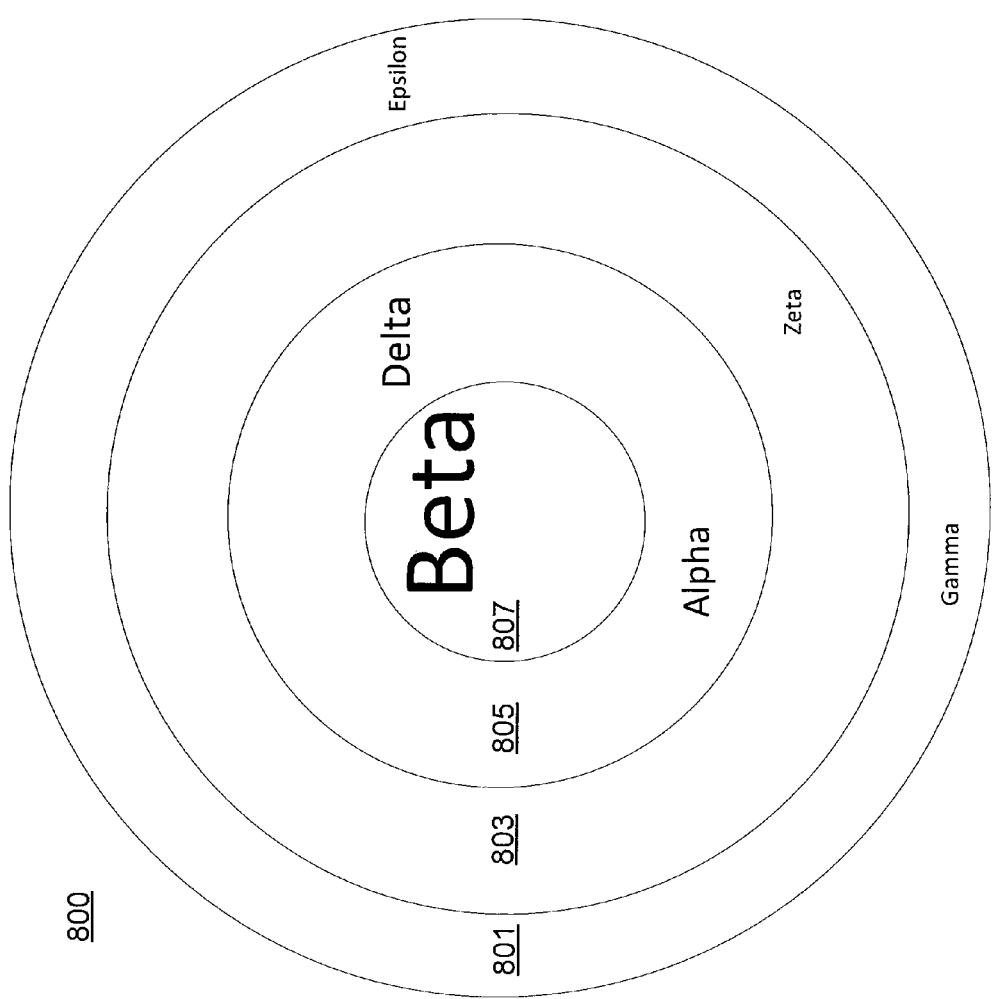
FIG. 9 illustrates another embodiment of a dynamic participation indicator using alphanumeric symbols.

FIG. 9 illustrates another embodiment of a dynamic participation indicator 800 using alphanumeric symbols. The dynamic participation indicator 800 may be shown as a system of concentric regions. The alphanumeric symbols of the various endpoints 20a-f may move from one region to the next as the respective scores of endpoints 20a-f fluctuates. For example, region 801 may correspond to a score less than 75, region 803 may correspond to a score of 75 to 100, region 805 may correspond to a score of 100 to 125, and region 807 may correspond to a score higher than 125.

Figure 10:
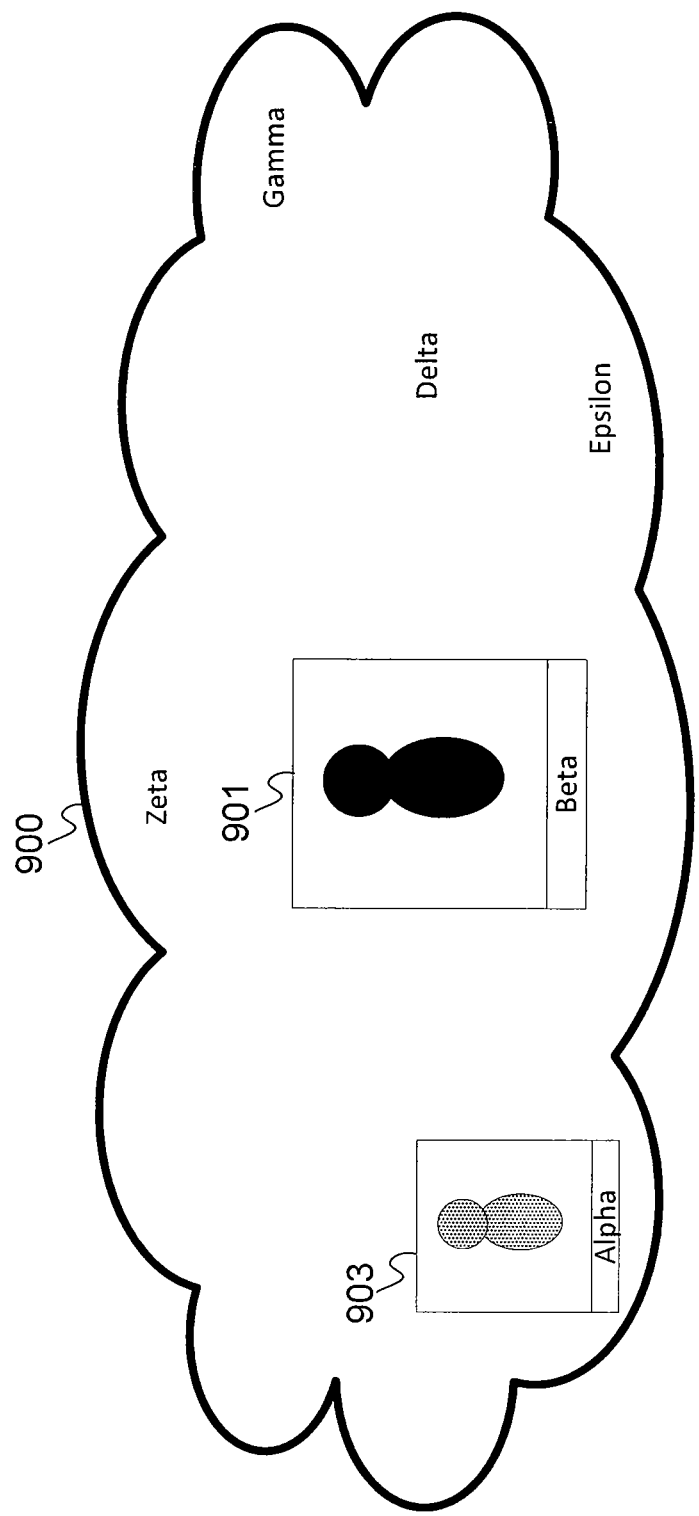
FIG. 10 is another embodiment of a dynamic participation indicator using alphanumeric symbols and dynamic video.

FIG. 10 is another embodiment of a dynamic participation indicator using alphanumeric symbols and dynamic video. In the example shown in FIG. 10, a conference includes six endpoints or sources: Alpha, Beta, Gamma, Delta, Epsilon, and Zeta. The example shown in FIG. 10 combines the "tag cloud" representation of FIGS. 3 and 4 with the dynamic video of FIGS. 5-7. In other words, the dynamic videos may be shown in a "tag cloud." For example, the location of the video, the size of the video and/or the video format, which may include the refresh rate of the video or the resolution of the video, is varied according to the participation level of the source. The size of the video or the video format is selected based on the score of the participant.

The particular point in time shown in FIG. 10 may indicate that the endpoint corresponding to Beta video 901 has been the most active participant and the endpoint corresponding to Alpha video 903 has been the next most active participant. Less active participants (or less capable endpoints) may be shown with smaller video or no video at all.

Figure 11:
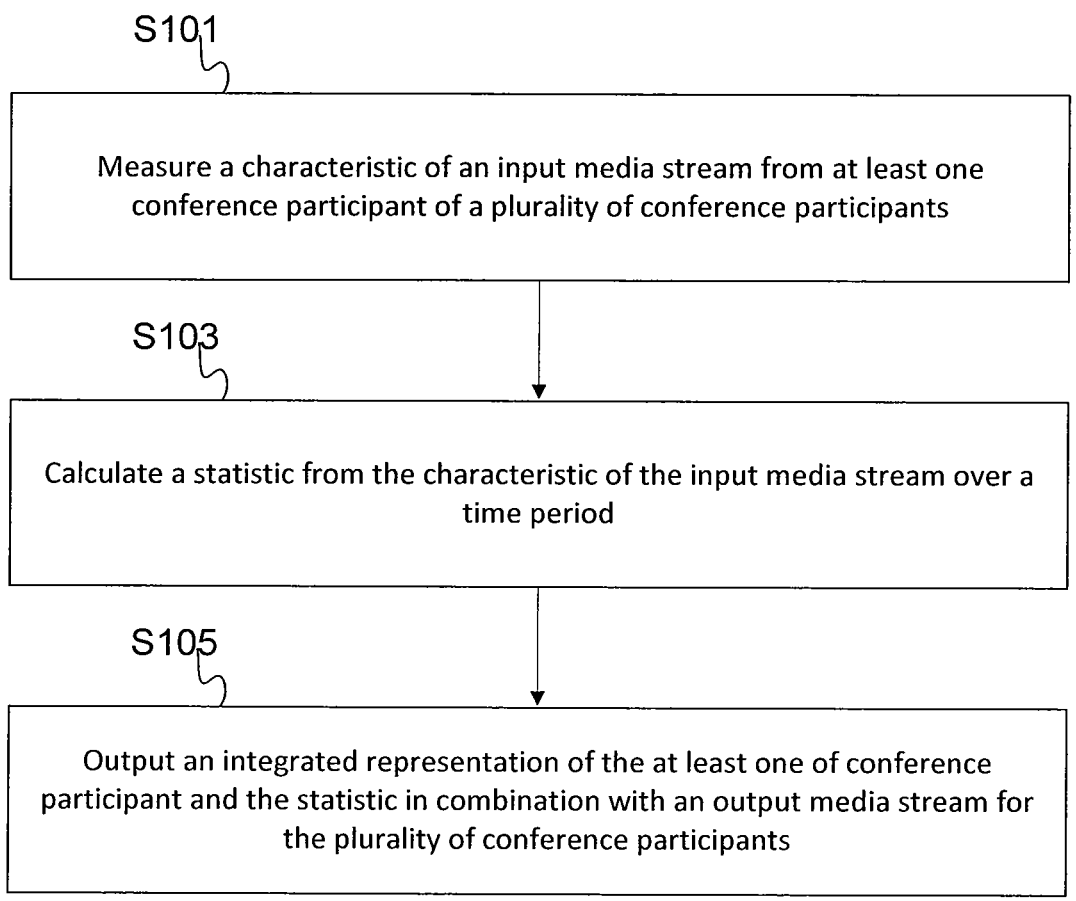
FIG. 11 illustrates a flow chart of one embodiment of a method employed by the conference bridge.

FIG. 11 illustrates a flow chart of one embodiment of a method employed by the conference bridge 10. At block 5101, the conference bridge 10 measures a characteristic of an input media stream from at least one conference participant of a plurality of conference participants (e.g. any of endpoints 20a-f). At block 5103, the conference bridge 10 calculates a statistic from the characteristic of the media stream over a time period. At block S105, the conference bridge 10 outputs an integrated representation of the at least one of conference participant and the statistic in combination with an output media stream for the plurality of conference participants. The integrated representation of the source and the statistic may be displayed by one or more of the endpoints 20a-f. In one embodiment, negative factors are output on a more limited basis, such as just to the originator of the conference or a supervisor involved in the conference.

Various embodiments described herein can be used alone or in combination with one another. The foregoing detailed description has described only a few of the many possible implementations of the present invention. For this reason, this detailed description is intended by way of illustration, and not by way of limitation.

I claim:

1. A method comprising:
    measuring, with a processor, a characteristic of an input media stream received from at least one conference participant of a plurality of conference participants;
    calculating, with the processor, a statistic from the characteristic of the input media stream over a time period; and
    outputting, with the processor, an integrated representation of the at least one conference participant and the statistic in combination with an output media stream for the plurality of conference participants.

2. The method of claim 1, wherein the characteristic indicates whether the input media stream is active, and the statistic is a percentage of the time period that the input media stream was active.

3. The method of claim 1, wherein the integrated representation includes a alphanumeric symbol indicative of the conference participant that changes size, location, or size and location according to the statistic.

4. The method of claim 1, wherein the integrated representation includes a video from the input media stream displayed in a video size, a resolution, or a refresh rate according to the statistic.

5. The method of claim 1, further comprising:
    measuring, with the processor, a second characteristic of a second input media stream from a second conference participant of the plurality of conference participants;
    calculating, with the processor, a second statistic from the characteristic of the second input media stream over the time period; and
    outputting, with the processor, a second integrated representation of the second statistic and the second conference participant in combination with the output media stream for the plurality of conference participants.

6. The method of claim 5, wherein the integrated representation and the second integrated representation provide a comparison of talk time between the conference participant and the second conference participant.

7. The method of claim 1, wherein the characteristic is whether the input media stream is active, and the statistic is selected from the group consisting of an indication of how much time the conference participant is active at the same time as another conference participant, a length of continuous activity by the conference participant, or an indication of how often the conference participant yields to another conference participant.

8. The method of claim 1, wherein the characteristic is selected from the group consisting of an amount of time that the conference participant has shared a document, an amount of time that the conference participant has provided input to a white board, an amount of time that the conference participant has shared a video or presentation, or an amount of instant messages within the conference sent by the conference participant.

9. The method of claim 1, wherein the characteristic is selected from the group consisting of an amount of time that the conference participant has been muted, an amount of time the conference participant has been in an idle state due to inactivity, and an amount of instant messages outside of the conference sent by the conference participant.

10. An apparatus, comprising:
    an input interface configured to receive a media stream from a source;
    a controller configured to calculate at least one statistic from the media stream over a time period, wherein the statistic indicates a participation level of the source; and
    an output interface configured to transmit a combined representation of the statistic and the source for display on the source.

11. The apparatus of claim 10, wherein the input interface and the output interface are integrated as a single communications interface.

12. The apparatus of claim 10, wherein the characteristic indicates whether the media stream is active, and the statistic is a percentage of the time period that the media stream was active.

13. The apparatus of claim 10, wherein the integrated representation includes an alphanumeric symbol indicative of the source that changes size and/or location according to the statistic.

14. The apparatus of claim 10, wherein the combined representation includes a video from the media stream displayed in a video size, a resolution, or a refresh rate according to the statistic.

15. One or more non-transitory computer readable storage media encoded with software comprising computer executable instructions and when the software is executed is operable to:
- measure a characteristic in each of a plurality of media streams from a plurality of endpoints;
- calculate a statistic of the characteristic in each of the plurality of media streams over a time period;
- represent the statistic for each of the plurality of media streams in combination with an alphanumeric representation of the source as a dynamic conference participation symbol; and
- output the dynamic conference participation symbol to at least one of the plurality of endpoints.

16. The one or more non-transitory computer readable storage media of claim 15, wherein the characteristic indicates whether the media stream is active, and the statistic is a percentage of the time period that the media stream was active.

17. The one or more non-transitory computer readable storage media of claim 15, wherein the dynamic conference participation symbol includes a plurality of alphanumeric symbols that are indicative of the plurality of endpoints and change size and/or location according to the statistic.

18. The one or more non-transitory computer readable storage media of claim 15, wherein the dynamic conference participation symbol includes a video from the media stream displayed in a video size, a resolution, or a refresh rate according to the statistic.

19. The one or more non-transitory computer readable storage media of claim 15, wherein the characteristic is whether the media stream is active, and the statistic is selected from the group consisting of an indication of how much time an endpoint is active at the same time as another endpoint, a length of continuous activity by the endpoint, or an indication of how often the endpoint yields to another endpoint.

20. The one or more non-transitory computer readable storage media of claim 15, wherein the statistic is selected from the group consisting of an amount of time that an endpoint has shared a document, an amount of time that the endpoint has provided input to a white board, an amount of time that the endpoint has shared a video or presentation, or an amount of instant messages within the conference sent by the endpoint.

* * * * *